United States Patent [19]

Bruckert et al.

[11] Patent Number: 4,584,713
[45] Date of Patent: Apr. 22, 1986

[54] SIGNAL QUALITY STEERED DIVERSITY

[75] Inventors: Eugene J. Bruckert, Arlington Heights; James S. Butcher, Glendale Heights, both of Ill.; Thomas F. Kneisel, Davie, Fla.

[73] Assignee: Motorola, Inc., Schaumburg, Ill.

[21] Appl. No.: 712,285

[22] Filed: Mar. 15, 1985

Related U.S. Application Data

[63] Continuation-in-part of Ser. No. 511,431, Jul. 6, 1983, abandoned.

[51] Int. Cl.⁴ .............................................. H04B 7/08
[52] U.S. Cl. ..................................... 455/277; 375/100
[58] Field of Search ................. 455/52, 277, 133, 135, 455/140; 375/40, 100

[56] References Cited

U.S. PATENT DOCUMENTS

| | | | |
|---|---|---|---|
| 3,628,149 | 12/1971 | Swan | 455/133 |
| 3,651,406 | 3/1972 | Mohr et al. | 455/133 |
| 3,963,988 | 6/1976 | Niethammer | 375/40 |
| 3,975,687 | 8/1976 | Tan et al. | 455/133 |
| 4,015,205 | 3/1977 | Ikeda et al. | 375/100 |
| 4,530,087 | 7/1985 | Yamamoto | 455/135 |

Primary Examiner—Marc E. Bookbinder
Attorney, Agent, or Firm—James E. Jacobson, Jr.; Edward M. Roney; Donald B. Southard

[57] ABSTRACT

A circuit and technique for directing an adaptable antenna system is described. The invention is coupled to the output of an RF receiver configured to provide a data signal output, and evaluates the quality of the receiver data signal. The invention switches antennas when the signal quality deteriorates below a predetermined level.

15 Claims, 6 Drawing Figures

SIGNAL QUALITY STEERED DIVERSITY

CROSS-REFERENCE TO RELATED APPLICATIONS

This is a continuation-in-part application based on Ser. No. 06/511431, filed July 6, 1983 now abandoned.

BACKGROUND OF THE INVENTION

1. Field of Invention

This invention relates to the field of portable communication transceivers and specifically to a portable transceiver circuit which determines the quality of a received signal and directs the tranceiver to select an alternative antenna if the signal quality deteriorates below a predetermined level.

2. Description of the Prior Art

Portable radio transceivers are used in several facets of communications technology. Portable transceivers can be found in paging systems, two-way communication systems such as those used by police and other public servants, and more recently portable receivers have found use in portable data terminals which are used to communicate with a host computer over a radio link. Portable data terminals provide computer diagnostics and expanded computer power in the portable terminal.

Typical portable paging receivers in the past have incorporated loop-type antennas which are typically responsive to the magnetic field component of a transmitted RF signal. This type of antenna system provides marginal performance, but is desirable because the loop antenna can be concealed within a radio housing and responds well when the receiver is in close proximity to a human body. However, the overall sensitivity of the antenna/receiver combination is somewhat degraded where the receiver is in close proximity to a human body. In addition, loop-type antennas exhibit certain problems which make them undesirable for use in a portable device which also utilizes a transmitter.

Portable units which contain both a receiver and transmitter are utilized in public service and private industry where communication between a number of units is desirable. The units typically contain a receiver and transmitter used in combination with an external helical, monopole or dipole antenna. These antennas are responsive to the electrical field of an RF signal and provide superior reception and transmission characteristics, when the antenna is located externally to the portable device housing. In addition, helical and monopole antenna performance is degraded substantially when the antenna is operated in close proximity to a human body.

A paging receiver is normally worn on the body when in use. Unlike the pager, a portable transceiver is utilized in many different environments. It may be handheld in front of the face, worn on the hip, or placed on a conducting or non-conducting surface.

With the advance of data processing and data communication techniques, it is now desirable to manufacture portable communication devices which are capable of transmitting and receiving data in cooperation with a host computer. These devices are for instance useful to servicemen who use the portable terminal to perform on-site computer testing and diagnostics, and to keep records thereof. It is desirable to manufacture a portable data terminal as small as possible, so the terminal can be transported easily. In addition, it is also desirable to provide a portable data terminal with an antenna system which is completely enclosed within the terminal housing. This feature enhances the portability of the data terminal, as well as providing protection for the terminal antenna system.

These terminals may be carried in the hand, worn on the hip, put in a coat pocket, used on a desk, or put into a service tool kit. The orientation of the unit, as well as its physical environment is constantly changing as it is utilized from one time to the next.

Since the portable data terminal is operated in a number of distinct environments and orientations, it is necessary to provide an antenna system which is adaptable to a changing environment. Adaptability is especially useful when the portable data terminal is used in close proximity to a human body.

In an adaptable antenna system, the receiver must include a means for alternately activating antennas in response to the quality of a received signal. Prior art antenna switching devices have typically based the antenna switching decision on the signal strength of an incoming RF signal. This technique switches antennas when the incoming signal drops below a predetermined threshold. To implement a signal strength based antenna decision, expensive RF circuitry is required to process signal strength information. In addition, signal strength based antenna switching is prone to "chattering" when the signal level for each antenna is below a predetermined threshold.

For the foregoing and other shortcomings, there is a need for an improved adaptable antenna system control scheme for use with a transceiver in which the antenna system activates a particular antenna based on the signal quality of the incoming signal. Signal quality information is derived from the receiver output signal and does not require any special RF amplifiers to determine signal quality.

SUMMARY OF THE INVENTION

Accordingly, it is an object of the present invention to provide an improved antenna selector device which utilizes a measurement of the audio signal quality to determine whether to switch to an alternate antenna.

It is a further object of the present invention to implement an antenna hold feature so rapid antenna switching will not occur at low signal levels.

It is still another object of the present invention to implement an antenna selector device which effects the antenna switch at a time optimized for reduced data errors due to switching transients.

Briefly described, the invention contemplates an antenna switching circuit and technique which is used to control an adaptable antenna system in a portable transceiver. The inventive antenna switching circuit is coupled to the audio output of a receiver, which is configured to provide a data output signal. The receiver is coupled to a bit quality detector which samples each incoming data bit at four times the data rate. Each data cycle is stored in a shift register. The data sample corresponding to the middle of the data bit is retained as the value of the data bit and the data bit together with both adjacent data samples are compared to generate a noise flag bit. If the bit transition jitter is less than $\pm \frac{1}{4}$ bit, the noise flag bit is 0 otherwise the noise flag bit is set to 1. The incoming data stream and noise flag bit stream is then coupled to a microcomputer which operates in conjunction with the bit quality and data storage registers. When 8 data bits and the corresponding 8 noise flag bits have been accumulated, the bits are read into the microcomputer memory and processed in accordance with the present invention. According to the present invention, the microprocessor retains 14 bytes of previous noise flag bit information. The microcomputer then compares the flag rate being generated by the presently connected antenna with the flag rate which was generated by the previously connected antenna. If the previously connected antenna has been disconnected for 14 bytes then its flag rate is set to (a fixed value) K/14, where K is an integer greater than or equal to 0. In the present embodiment, K is set to 5. If the antenna presently connected produces a flag rate higher than the previously connected antenna, the microprocessor will pause and switch antennas at a time which minimizes bit errors due to switching transients.

DETAILED DESCRIPTION OF THE DRAWINGS

Figure 1:
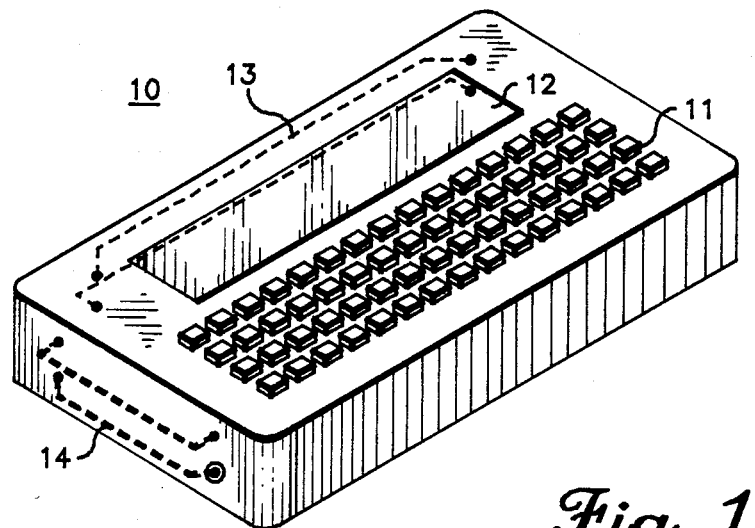
FIG. 1 is a perspective drawing of a portable data receiver such as one which would incorporate the preferred embodiment of the present invention.

FIG. 1 shows a perspective drawing of a portable data communication device such as one which would incorporate the preferred embodiment of the present invention. The portable transceiver 10 incorporates a display 12 and a keyboard 11 and is used to communicate with a host computer. The portable transceiver 10 transmits and receives modulated data and can be used to provide on-site computer diagnostics. The portable transceiver 10 is constructed of a plastic housing which encases the terminal and radio electronic circuits, as well as an adaptable antenna system including a plurality of antennas which may be optimized for specific environmental conditions, for example, on the body versus off the body use. An exact description of the receiver antenna system is shown in copending patent application Ser. No. 511,430 entitled "Homotropic Antenna System" by Kneisel et al filed July 6, 1983 and assigned to the assignee of the present invention. The present invention operates in cooperation with the receiver and determines which antenna 13, 14 is producing a higher quality signal, and selects that antenna.

Figure 2:
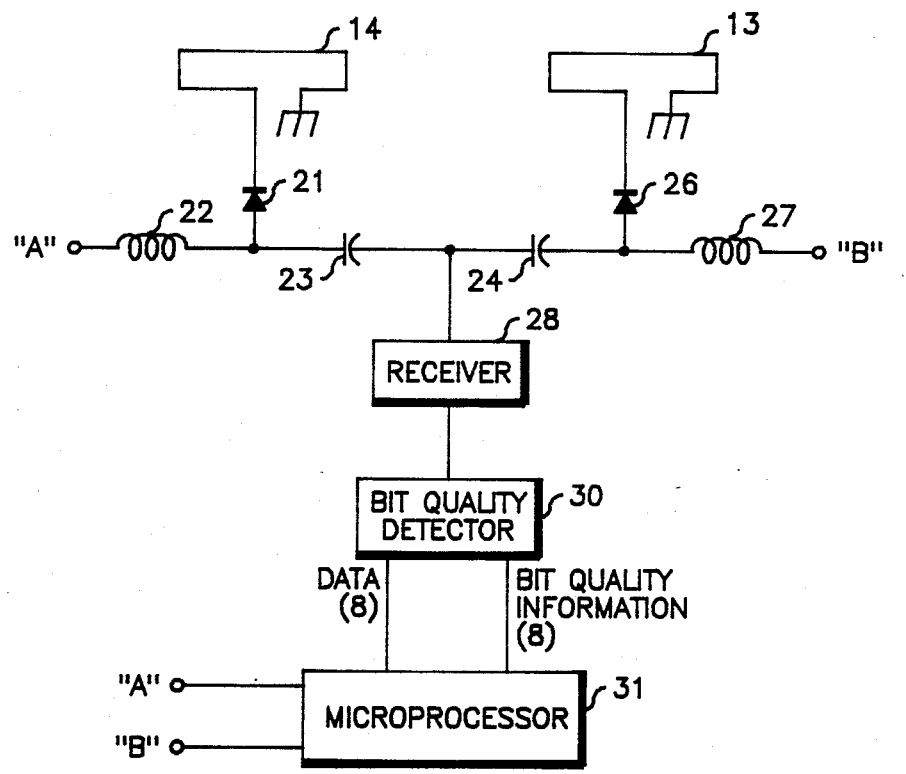
FIG. 2 is a block diagram of an antenna system which would incorporate an embodiment of the present invention.

FIG. 2 shows an electrical schematic and block diagram of a data receiver which would utilize the preferred embodiment of the present invention. The data terminal includes two antennas 14, 13 which are coupled to diodes 21, 26. The antennas are selectively activated through inductors 22, 27 by placing a control voltage on terminals "A" or "B". Antennas 14, 13 are then coupled to a receiver 28 through capacitors 23, 24. The receiver 28 processes the received signal and converts it to a lower frequency signal of the desired form, in this case binary data at approximately 4800 bits/sec. The receiver data output is then coupled to a bit quality detector 30 which generates a binary signal corresponding to the binary data signal which provides a flag bit indicating the quality of a received bit. The bit quality detector circuit 30 will be discussed in more detail later.

The bit quality detector 30 is coupled to a microprocessor 31 which processes the incoming data and bit quality information in accordance with the present invention. The microprocessor 31 then selectively activates antenna 14 or 15 depending on the quality of the incoming signal being produced by a particular antenna. The microprocessor 31 can be any suitable conventional microprocessor, such as, for example, a Motorola type MC146805 and its RAM and other peripheral devices.

Figure 3:
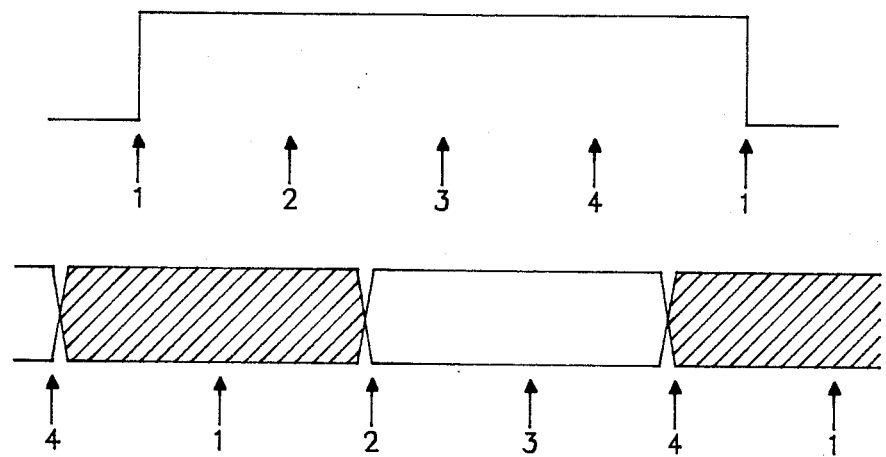
FIG. 3 is a illustration of the sampling scheme for determining bit quality in accordance with the present invention.

FIG. 3 is an illustration of the sampling scheme for determining bit quality in accordance with the present invention. As shown in FIG. 3, each incoming data bit is sampled four times. According to the present invention, a data bit of acceptable integrity is defined as having less than $\pm\frac{1}{4}$ bit transition time jitter. Therefore, according to FIG. 3, if samples 2, 3 and 4 are the same, i.e., all ones or zeros, then the noise flag will be set to zero for that bit, otherwise, the noise flag is 1.

Figure 4:
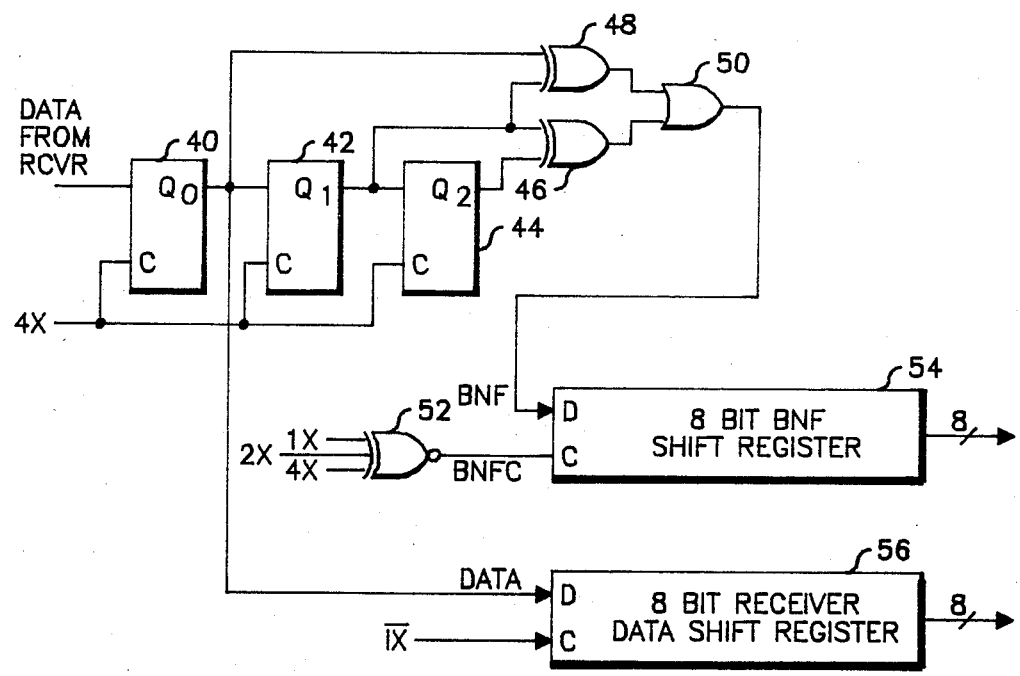
FIG. 4 is an electrical schematic of a circuit which generates bit quality information bits utilized by the present invention.

FIG. 4 shows an electrical schematic of a circuit in bit quality detector 30 in FIG. 2 which generates noise flag bit information in accordance with the present invention. The bit noise flag generator circuit consists of a series of flip-flops 40, 42, 44 which are configured as a 3 bit shift register. Samples are shifted into the three bit shift register at four times the data rate as shown by terminal 4X coupled to flip-flops 40, 42 and 44. The three outputs of this shift register provide the four sample per bit information required to recover clock and data and generate bit noise flags.

A separate circuit (not shown) decodes the data stream and produces a clock signal at the clock rate, a clock signal at twice the data rate and a clock signal at four times the data rate. The clock recovery circuit could be any conventional digital phase locked loop configured to lock the detector clock onto the incoming data stream. The four samples occur on the rising edge of 4X serial data clock. The 1X and 2X clocks are derived from the 4X clock by simple divide by 2 stages. The 1X and 2X clocks are used to uniquely identify the position of the four samples as they are shifted through the 3 bit register.

The recovered data signal is derived from the output of flip-flop 40 and corresponds to sample 3 of FIG. 3. The data sample is then shifted to the 8 bit data register 56 on each falling edge of the 1X clock. The bit noise flag information is generated by logic gates 46, 48 and 50. The bit noise flag bit is shifted into the 8 bit BNF register 54 on the rising edge of the BNF clock (BNFC). This clock (BNFC) is derived by the 3-input NOR gate 52 at the fall of the 4X clock following sample 4 of FIG. 3, which fall occurs when samples 4, 3 and 2 are all present in flip-flops 40, 42 and 44 respectively and the bit noise flag NNBF has been decoded in gate 50. This occurs when flip-flop 40 stores sample 4, flip-flop 42 stores sample 3, and flip-flop 44 stores sample 2. The exclusive OR gates 48, 46 and OR gate 50 are coupled so that they generate an output according to the logical relationship.

$$BNF = [2 \oplus 3] + [3 \oplus 4]$$

After eight data bits and the corresponding BNF bits have been shifted into the registers 54, 56, the information is transferred to buffer registers (not shown) which are accessed by the microprocessor 31 of FIG. 2.

Figure 5:
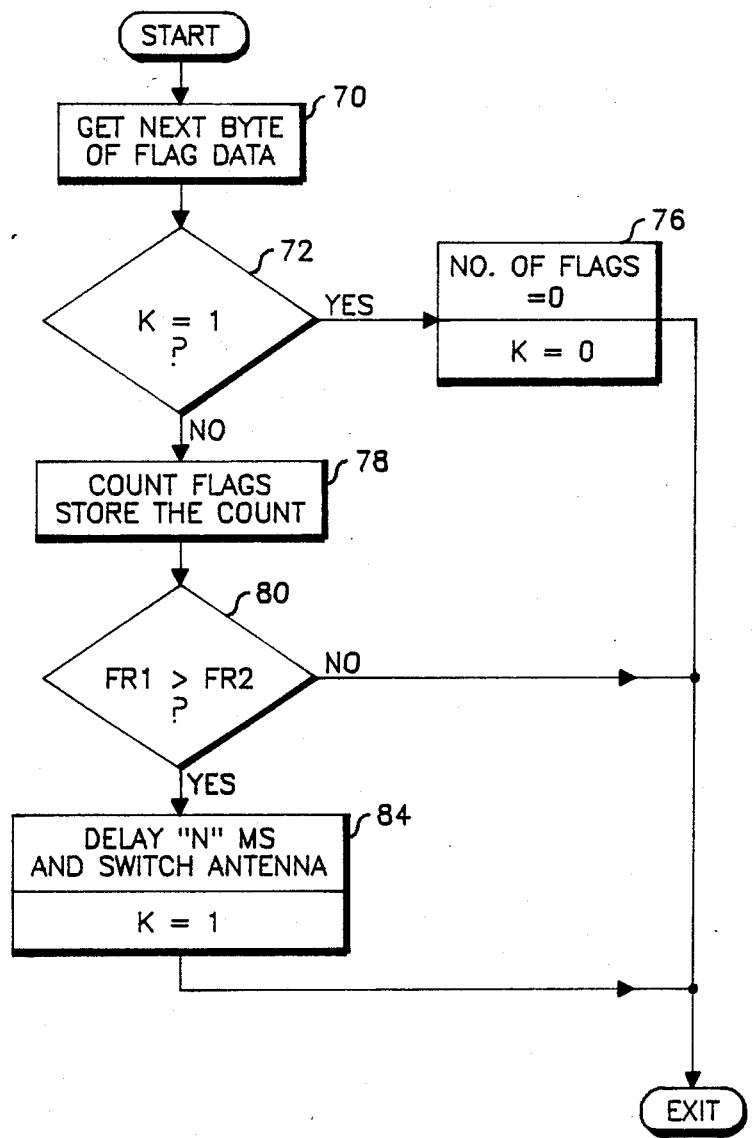
FIG. 5 is a flow diagram which details the operation of the present invention.

FIG. 5 shows a flow diagram which defines the microprocessor (31 of FIG. 2) operation in accordance with the preferred embodiment of the present invention. The process of the present invention keeps a running total of how many bits are flagged and which antenna is connected when each byte's worth of data is received. The inventive process decides that the antenna is to be switched if and only if there is at least one flag bit that is a 1 in the most recently received byte and the flag rate from the non-attached antenna (FR2) is less than the flag rate of the attached antenna (FR1). Flag rate 2 (FR2) is defined as the number of flags received in the last fourteen bytes when the non-attached antenna 2 was attached divided by the number of bytes when the non-attached antenna was attached. FR2 is equal to zero if non-attached antenna was not attached during the last 14 bytes. Flag rate 1 (FR1) for the attached antenna FR1 is defined in the same manner.

When an antenna switch is effected, the number of flags in the byte where the antenna switch occurred is set to zero and the associated byte is considered to belong to the antenna that was switched in. The inventive process also causes the switching action to occur at a particular time before the next bit enters the antenna terminals. For the purposes of the preferred embodiment the microprocessor (31 in FIG. 2) is adjusted to switch the antenna about 50 microseconds before the bit transition enters the antenna terminals. This feature allows the antenna system to switch antennas at a time which minimizes bit errors due to switching transients.

In accordance with the present invention, the program shown in FIG. 5 is initated every time the BNF and data registers (54, 56 in FIG. 4) have accumulated eight bits. Item 70 instructs the microprocessor to read the contents of the data and BNF registers into the microprocessor RAM. For the purposes of the present invention, 14 bytes of previous BNF information for the antennas are also retained in RAM. Decision 72 examines the byte count K for the currently activated antenna. If the byte count K indicates that an antenna switch occured during the last BNF byte (i.e. K=1), decision 72 directs the program to item 76 which sets the BNF count to zero because this byte has been corrupted by the antenna switching transient. The byte count K is then reset and item 76 exits the routine to wait for the next byte.

If an antenna switch did not occur during the last BNF byte (i.e. K=0), decision 72 selects item 78 which counts and stores the BNF information of the latest byte. The program proceeds to decision 80 which compares the relative flag rates FR1 and FR2 of the two antennas. The flag rate FR of a particular antenna is defined according to the following relationship.

$$FR(n) = \frac{\text{number of flag bits from antenna}(n)}{\text{number of antenna bytes antenna}(n)}$$

Flag rate 2 (FR2) is always associated with the detached antenna. If flag rate 1 (FR1) is greater than the flag rate from the detached antenna FR2, the program proceeds to item 84 which waits approximately 50 microseconds before the next bit enters the receiver and then switches antennas. Item 84 then resets the byte count to 1 and exits the routine.

If flag rate 1 (FR1) is less than or equal to flag rate 2 (FR2), an antenna switch is not required and decision 80 exits the routine.

Figure 6:
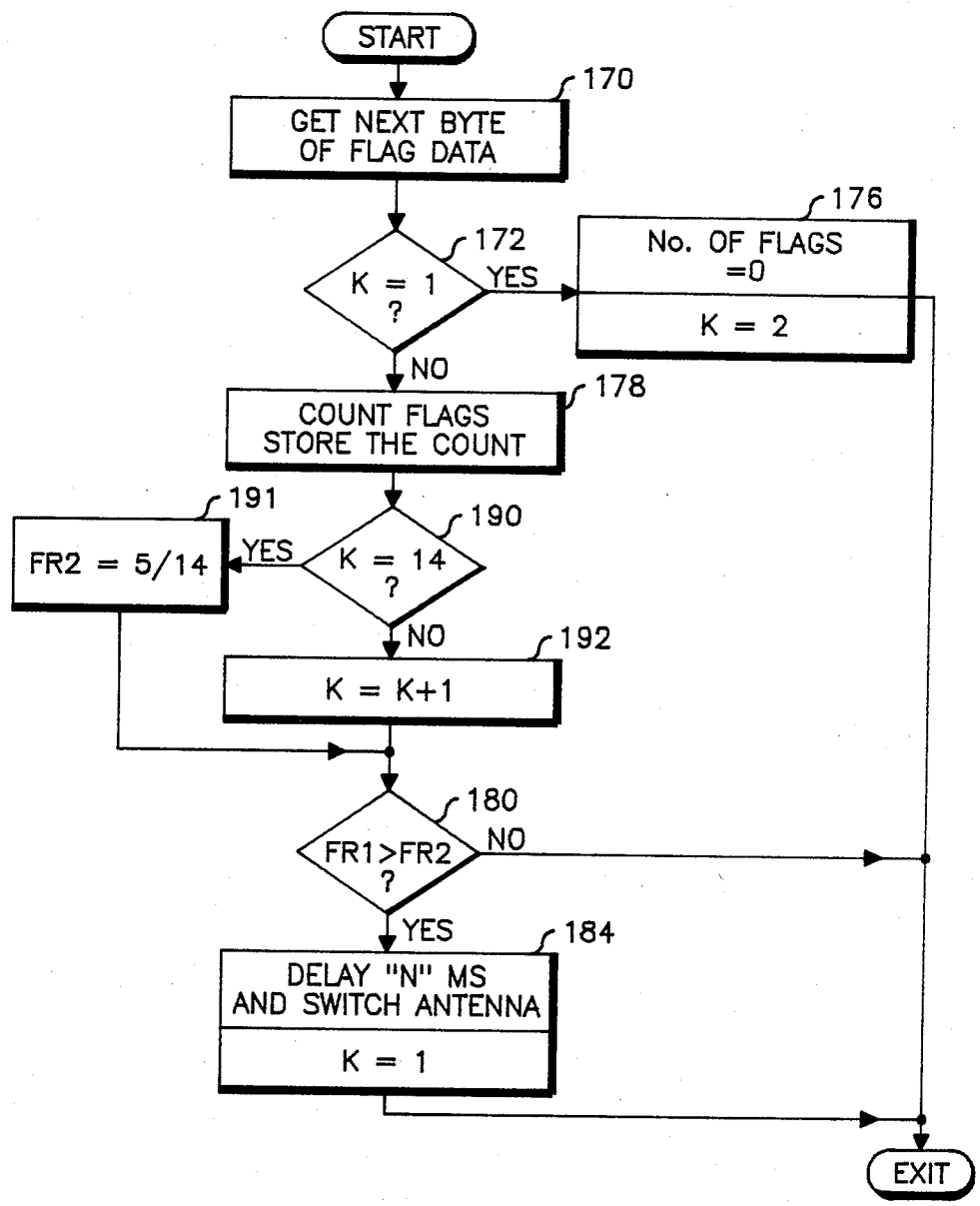
FIG. 6 is a flow diagram which details the operation of another embodiment of the present invention.

FIG. 6 shows a flow diagram which defines the microprocessor (31 of FIG. 2) operation in accordance with another embodiment of the present invention. The process of the present invention keeps a running total of how many bits are flagged and which antenna is connected when each byte's worth of data is received. The inventive process decides that the antenna is to be switched if and only if the flag rate from the non-attached antenna (FR2) is less than the flag rate of the attached antenna (FR1). Flag rate 2 (FR2) is defined as the number of flags received in the last fourteen bytes when the non-attached antenna 2 was attached divided by the number of bytes when the non-attached antenna was attached. FR2 is set equal to X/14 if the previously connected antenna has been disconnected for 14 bytes then its flag rate is set to (a fixed value) X/14, where X is an integer greater than or equal to 0. In the present embodiment, X is set to 5, if the non-attached antenna was not attached during the last 14 bytes. Flag rate 1 (FR1) for the attached antenna FR1 is defined in the same manner.

When an antenna switch is effected, the number of flags in the byte where the antenna switch occurred is set to zero and the associated byte is considered to belong to the antenna that was switched in. The inventive process also causes the switching action to occur at a particular time before the next bit enters the antenna terminals. For the purposes of the preferred embodiment the microprocessor (31 in FIG. 2) is adjusted to switch the antenna about 50 microseconds before the bit transition enters the antenna terminals. This feature allows the antenna system to switch antennas at a time which minimizes bit errors due to switching transients.

In accordance with the present invention, the program shown in FIG. 6 is initated every time the BNF and data registers (54, 56 in FIG. 4) have accumulated eight bits. Item 170 instructs the microprocessor to read the contents of the data and BNF registers into the microprocessor RAM. For the purposes of the present invention, 14 bytes of previous BNF information for the antennas are also retained in RAM. Decision 172 examines the byte count K for the currently activated antenna. If the byte count K indicates that an antenna switch occured during the last BNF byte (i.e. K=1), decision 172 directs the program to item 176 which sets the BNF count to zero because this byte has been corrupted by the antenna switching transient. The byte count K is then set to two and item 176 exits the routine to wait for the next byte.

If an antenna switch did not occur during the last BNF byte (i.e. K≠1), decision 172 selects item 178 which counts and stores the BNF information of the latest byte. If the byte count K=14 decision 190 selects item 191 which sets flag rate 2(FR2)=5/14. If the byte count K≠14 (i.e. <14) then decision 190 selects item 192 which increments the byte count K. The program proceeds to decision 180 which which compares the relative flag rates FR1 and FR2 of the two antennas. The flag rate FR of a particular antenna is defined according to the following relationship.

$$FR(n) = \frac{\text{number of flag bits from antenna}(n)}{\text{number of antenna bytes antenna}(n)}$$

Flag rate 2 (FR2) is always associated with the detached antenna. If flag rate 1 (FR1) is greater than the flag rate from the detached antenna FR2, the program proceeds to item 84 which waits approximately 50 microseconds before the next bit enters the receiver and then switches antennas. Item 84 then resets the byte count to 1 and exits the routine.

If flag rate 1 (FR1) is less than or equal to flag rate 2 (FR2), an antenna switch is not required and decision 180 exits the routine.

In summary, a device capable of directing a switched antenna diversity system is described. The antenna switching system examines bit quality information generated by an electronic circuit and switches antennas based on the relative bit flag rate being produced by each antenna. The invention effects antenna switches at a time chosen to minimize bit error due to switching transients. Accordingly, other modifications uses and embodiments will be apparent to one skilled in the art without departing from the spirit and scope of the principles of the present invention.

What is claimed is:

1. An antenna control circuit for selecting a particular antenna in an adaptable antenna system, including a presently selected antenna and an alternate antenna, based on the output data signal of a receiver configured to receive a modulated data signal comprising:
means for sampling each bit of the received data signal a plurality of times and producing respective noise flag bits indicative of the quality of the data signal receiver output using, respectively, the presently selected antenna or the alternate antenna; and
means for processing the respective noise flag bits for the presently selected antenna and alternate antenna and selecting the alternate antenna if data signal quality indicated by the processed noise flag bits for the presently selected antenna is lower than data signal quality for the alternate antenna.

2. A method for selecting a particular antenna in an adaptable antenna system, including a presently selected antenna and an alternate antenna, based on the output signal of a receiver configured to receive a modulated data signal comprising the steps of:
sampling each bit of the received data signal a plurality of times;
producing respective noise flag bits indicative of the quality of the data signal received using, respectively, the presently selected antenna or the alternate antenna;
processing the noise flag bits for the presently selected antenna and the alternate antenna; and
selecting the alternate antenna if the data signal quality indicated by the processed noise flag bits for the presently selected antenna is lower than the data signal quality for the alternate antenna.

3. A method for selecting one of two antennas in an adaptable antenna system including a presently selected antenna and an alternate antenna for receiving an RF data signal having a plurality of bits comprising the steps of:
receiving the RF data signal;
converting the received RF data signal to a baseband data signal;
sampling each bit of the baseband data signal at least four times;
comparing the data samples and generating a noise flag bit based on a predetermined criteria;
accumulating multiple bytes of noise flag bits;
generating a respective noise flag rate based on at least two noise flag bytes for each of the presently selected antenna and the alternate antenna; and
selecting the alternate antenna if the noise flag rate of the presently connected antenna is greater than the noise flag rate of the alternate antenna.

4. An antenna control circuit for selecting a particular antenna in an adaptable antenna system including a presently selected antenna and an alternate antenna based on the output signal of a receiver configured to receive a modulated data signal comprising:
means for sampling each bit of the baseband data signal a plurality of times;
means for comparing the data samples and generating a noise flag bit based on predetermined criteria;
means for accumulating multiple bytes of noise flag bits;
means for generating a respective noise flag rate based on at least two noise flag bytes for each of the presently selected antenna and the alternate antenna; and
means for selecting the alternate antenna if the noise flag rate of the presently connected antenna is greater than the noise flag rate of the alternate antenna.

5. A method for selecting one of two antennas in an adaptable antenna system, including a presently selected antenna and an alternate antenna for receiving an RF data signal having a plurality of bits comprising the steps of:
receiving the RF data signal;
converting the received RF data signal to a baseband data signal;
sampling each bit of the baseband data signal at least four times;
storing the four data samples in a register;
retaining a data sample as the value of the data bit;
comparing the data samples and generating a noise flag bit based on a predetermined criteria;
accumulating multiple bytes of noise flag bits and retained data bits;
generating a respective noise flag rate based on at least two noise flag bytes for the presently selected antenna and alternate antenna;
comparing the noise flag rate of the presently selected antenna with the noise flag rate of the alternate antenna;
generating a delay if the noise flag rate of the presently connected antenna is greater than the noise flag rate of the alternate antenna; and
selecting the alternate antenna after the delay has elapsed.

6. The method of claim 5 wherein said generating step includes the step of generating noise flag bits according to the relationship $$[S2 \oplus S3] + [S3 \oplus S4]$$

where S2, S3 and S4 are the second, third and fourth data samples when the first sample occurs on the leading edge of each data bit.

7. An antenna control circuit for selecting a particular antenna in an adaptable antenna system including a presently selected antenna and an alternate antenna based on the output signal of a receiver configured to receive a modulated data signal comprising:
means for sampling each bit of the baseband data signal at least four times;
means for storing the four data samples in a register;
means for recovering a data sample as the value of the data bit;

means for comparing the data samples and generating a noise flag bit based on predetermined criteria;
means for accumulating multiple bytes of noise flag bits and recovered data bits;
means for generating a respective noise flag rate based on at least two noise flag bytes for each of the presently selected antenna and the alternate antenna;
means for comparing the noise flag rate of the presently selected antenna with the noise flag rate of the alternate antenna;
means for generating a delay if the noise flag rate of the presently connected antenna is greater than the noise flag rate of the alternate antenna; and
means for selecting the alternate antenna after the delay has elapsed.

8. An antenna control circuit for selecting one of two antennas in an adaptable antenna system, the antenna selection based on the data signal quality of a receiver output signal, said antenna control circuit comprising:
a first shift register having at least a first, second and third outputs and being coupled to the receiver output for sampling and storing an incoming data bit;
a first exclusive OR logic means with inputs coupled to said first and second shift register outputs for generating a first logic signal;
a second exclusive OR logic means with inputs coupled to said said second and third shift register outputs for generating a second logic signal;
OR logic means with inputs coupled to the outputs of said first and second exclusive OR logic means for generating noise flag bits;
means for generating a first, second and third clock signals locked to the incoming data stream for clocking said first shift register with the third clock signal;
NOR logic means with inputs coupled to said first, second and third clock signals and an output.
a second shift register with a clock and data input, said clock input coupled to said NOR logic means output signal, said data input coupled to said OR logic means for accumulating noise flag bits;
a third shift register with data and clock input, said clock input coupled to said first clock signal, said data input coupled to the first output of said first shift register for accumulating data bits;
processing means coupled to said second and third shift register for receiving noise flag and data bits and selecting one of the two antennas based on the noise flag bits.

9. An antenna control circuit for selecting a particular antenna in an adaptable antenna system, including a presently selected antenna and an alternate antenna, based on the output signal of a receiver configured to receive a modulated data signal comprising:
means for sampling each bit of the received data signal a plurality of times and producing respective noise flag bits indicative of the quality of the data signal receiver using, respectively, the presently selected antenna; and
means for processing the respective noise flag bits for the presently selected antenna and selecting the alternate antenna if a predetermined number of noise flag bits are detected within a predetermined number of bytes of the received data signal.

10. A method for selecting a particular antenna in an adaptable antenna system, including a presently selected antenna and an alternate antenna, based on the output signal of a receiver configured to receive a modulated data signal comprising the steps of:
sampling each bit of the received data signal a plurality of times;
producing respective noise flag bits indicative of the quality of the data signal received using the presently selected antenna;
processing the noise flag bits for the presently selected antenna;
selecting the alternate antenna if the number of noise flag bits detected during a predetermined period exceeds a predetermined constant.

11. A method for selecting one of two antennas in an adaptable antenna system including a presently selected antenna and an alternate antenna for receiving an RF data signal having a plurality of bits comprising the steps of:
receiving the RF data signal;
converting the received RF data signal to a baseband signal:
sampling each bit of the baseband signal at least four times;
comparing the data samples and generating a noise flag bit based on a predetermined criteria;
accumulating multiple bytes of noise flag bits;
generating a respective noise flag rate based on at least two noise flag bytes for the presently selected antenna; and
selecting the alternate antenna if the noise flag rate of the presently selected antenna exceeds a predetermined threshold.

12. An antenna control circuit for selecting a particular antenna in an adaptable antenna system including a presently selected antenna and an alternate antenna based on the output signal of a receiver configured to receive a modulated data signal, comprising:
means for sampling each bit of the baseband data signal a plurality of times;
means for comparing the data samples and generating a noise flag bit based on predetermined criteria;
means for accumulating multiple bytes of noise flag bits;
means for generating a respective noise flag rate based on at least two noise flag bytes of the presently selected antenna; and
means for selecting the alternate antenna if the noise flag rate of the presently connected antenna is greater than a predetermined constant.

13. A method for selecting one of two antennas in an adaptable antenna system, including a presently selected antenna and an alternate antenna for receiving an RF data signal having a plurality of bits comprising the steps of:
receiving the RF data signal;
converting the received RF data signal to a baseband data signal;
sampling each bit of the baseband data signal at least four times;
storing the four data samples in a register;
retaining a data sample as the value of the data bit;
comparing the data samples and generating a noise flag bit based on a predetermined criteria;
accumulating multiple bytes of noise flag bits and retained data bits;
generating a respective noise flag rate based on at least two noise flag bytes for the presently selected antenna;
comparing the noise flag rate of the presently selected antenna with a predetermined constant;

generating a delay if the noise flag rate of the presently connected antenna is greater than the predetermined constant; and selecting the alternate antenna after the delay has elapsed.

14. The method of claim 13 wherein said generating step includes the step of generating noise flag bits according to the relationship $$[S2 \oplus S3] + [S3 \oplus S4]$$

where S2, S3 and S4 are the second, third and fourth data samples when the first sample occurs on the leading edge of each data bit.

15. An antenna control circuit for selecting a particular antenna in an adaptable antenna system including a presently selected antenna and an alternate antenna based on the output signal of a receiver configured to receive a modulated data signal comprising:

means for sampling each bit of the baseband data signal at least four times;

means for storing the four data samples in a register;

means for recovering a data sample as the value of the data bit;

means for comparing the data samples and generating a noise flag bit based on predetermined criteria;

means for accumulating multiple bytes of noise flag bits and recovered data bits;

means for generating a respective noise flag rate based on at least two noise flag bytes for the presently selected antenna;

means for comparing the noise flag rate of the presently selected antenna with a predetermined constant;

means for generating a delay if the noise flag rate of the presently connected antenna is greater than the predetermined constant; and means for selecting the alternate antenna after the delay has elapsed.

* * * * *